United States Patent [19]

Nocek et al.

[11] 3,737,644
[45] June 5, 1973

[54] ARRANGEMENT FOR ILLUMINATING NON-PLANAR SURFACES

[75] Inventors: Stanley Nocek, Livingston; Albert J. Marko, Colts Neck; Leslie D. Zenack, Bloomfield, all of N.J.

[73] Assignee: The Bendix Corporation, Teterboro, N.J.

[22] Filed: Dec. 16, 1971

[21] Appl. No.: 208,790

[52] U.S. Cl. ............... 240/2.1, 40/130 K, 240/1 EL
[51] Int. Cl. ............................................. G01d 11/28
[58] Field of Search .................... 240/2.1, 1 EL, 2 R, 240/41.1; 40/130 R, 130 K

[56] References Cited

UNITED STATES PATENTS

| | | | |
|---|---|---|---|
| 3,561,145 | 2/1971 | Shotwell | 240/1 EL |
| 3,131,670 | 5/1964 | Hardesty | 40/130 K X |
| 3,040,168 | 6/1962 | Stearns | 240/2.1 |
| 3,349,234 | 10/1967 | Schwarz | 240/2.1 |

*Primary Examiner*—Richard Moses
*Attorney*—Anthony F. Cuoco and S. H. Hartz

[57] ABSTRACT

An arrangement including a planar optical wedge illuminated by a light source and transferring light energy to a prism which directs the light energy to a non-planar surface disposed behind the wedge and prism.

3 Claims, 2 Drawing Figures

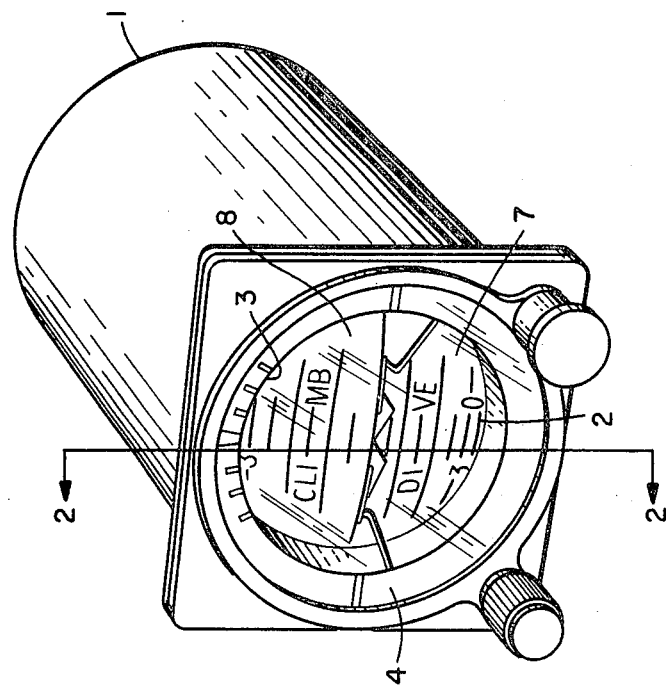
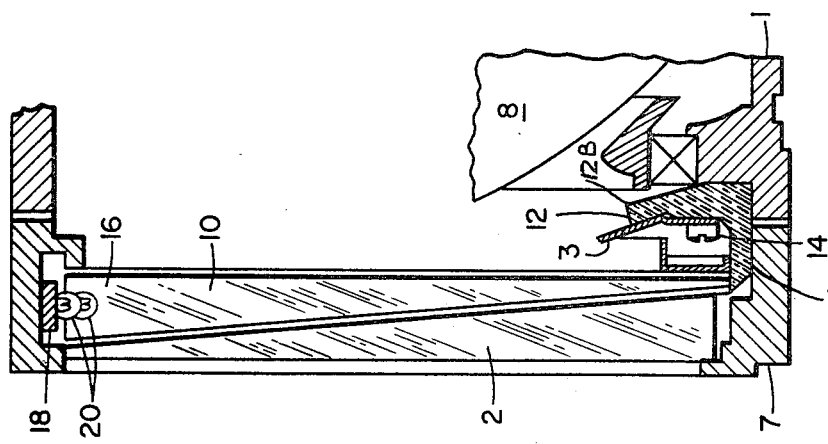

ARRANGEMENT FOR ILLUMINATING NON-PLANAR SURFACES

BACKGROUND OF THE INVENTION

1. Field of the Invention

This invention relates generally to means for illuminating non-planar surfaces and, more particularly, to a prism and wedge arrangement for providing adequate illumination without additional lamps at the bottom or behind the non-planar surface.

2. Description of the Prior Art

Aircraft attitude displays using spherical indicating instruments require lighting which has heretofore been achieved through trans-illumination with lamps behind the instrument or flood lighting with lamps located at or near the bottom of the instrument. Lighting arrangements of this type require additional lamps and make disassembly and reassembly in the case of lamp failure difficult.

SUMMARY OF THE INVENTION

The arrangement of the invention makes effective use of the relatively large amount of light energy available at the bottom of a lighting wedge, and which wedge illuminates a non-planar surface. A prism disposed at the bottom of the wedge directs this light energy back toward the surface and to areas thereof which normally receive insufficient light from the wedge. To this end the invention includes a planar wedge with lamps disposed at the top thereof and a prism at the bottom for appropriately directing the light onto the non-planar surface.

One object of this invention is to provide means for illuminating a non-planar surface.

Another object of this invention is to make effective use of the relatively large amount of light energy available at the bottom of a lighting wedge, and which wedge illuminates the non-planar surface, and to direct this light energy back towards a display disposed behind the light wedge and normally receiving insufficient light from the wedge.

Another object of this invention is to illuminate an aircraft attitude display system having a spherical indicator and to direct light toward the bottom of the indicator without using light sources at the bottom or behind the indicator.

The foregoing and other objects and advantages of the invention will appear more full hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is an isometric pictorial representation of an indicator utilizing a lighting arrangement according to the invention.

FIG. 2 is a sectional view taken along the lines 2—2 in FIG. 1 and showing a lighting arrangement according to the invention.

DESCRIPTION OF THE INVENTION

FIG. 1 shows an elongated can or casing 1 in which an aircraft attitude indicating instrument is contained. Can 1 is closed at its open or viewing end by a vertically disposed bezel window 2. Rearwardly of the window is fixed a dial plate 3 having a circular open central area about which borders a radially narrow dial face 4 divided into degrees as shown in FIG. 1. Extending horizontally across the open area of plate 3 is an attitude bar 5 which coincides with 90° markings on the dial face in normal flight of the aircraft.

Bar 5 is supported from the wall of casing 1. Casing 1 is intended to be fixed in the aircraft instrument panel in a level position so that the dial faces the pilot. A bezel 7 fronting window 2 accommodates bolts for securing the instrument in the instrument panel of the craft.

In close proximity to the rear of the bezel window and the dial face is a truncated spherical shell 8 of very light weight material such as aluminum. The upper half of the face portion of this sphere is suitably colored blue so as to indicate sky. The lower half of the sphere is suitable colored as brown or black to indicate earth. The division point of the colored sections provides an horizon line 9 which has a normal position when the instrument is level coinciding with attitude bar 5.

Sphere 8 functions to roll or rotate on a horizontal axis as the aircraft pitches so as to indicate climbing and diving attitudes of the craft. Lateral markings in contrasting colors on the respective colored areas of the sphere serve to indicate the degree of pitch relative to the attitude bar as the sphere rolls on its horizontal axis. Rotation of sphere 8 is gyro controlled. An instrument of this type is described and claimed in U.S. Pat. No. 2,912,766 issued Nov. 17, 1959 to Charles E. Hurlburt and assigned to The Bendix Corporation, assignee of the present invention.

With reference now to FIG. 2, a lighting wedge 10 is disposed behind cover glass 2 and is supported within bezel 7. The large end of the wedge is at the top and the small end is at the bottom of the bezel. Wedge 10 may be of a suitable optical glass or of an optical plastic such as Thermo Polacrylate. A prism 12 having a substantially J-shaped section is disposed within can 1 and bezel 7 between wedge 10 and sphere 8. The end of horizontally extending member 12A of J-shaped prism 12 is adjacent the small end of wedge 10. Vertical member 12B of prism 12 extends so that its outer edge makes an acute angle with member 12A, and which outer edge faces sphere 8. Dial plate 3 is secured by a screw 14 to the inner edge of vertical member 12B of J-shaped prism 12. Prism 12 may be of optical glass or of an optical plastic material such as is wedge 10.

A lighting assembly 16 is disposed at the top of bezel 7 near the large end of wedge 10. Lighting assembly 16 may include a base 18 and light bulb 20.

In operation light from bulbs 20 is transmitted through wedge 10 so that there is normally a large amount of light energy available at the bottom of the wedge. Prism 12 is arranged to direct this light energy back toward sphere 8 and into areas which normally would receive insufficient wedge light, but for the arrangement of the invention.

The advantages of the arrangement shown are now obvious. The necessity for additional lamps at the bottom of the wedge is obviated and complicated disassembly as in the case of lamp failure when the lamps are placed at the bottom or behind the display is eliminated. Light energy normally at the bottom of the light wedge, rather than wasted, is directed back toward the display in the area which normally receives insufficient light.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An arrangement for illuminating a non-planar surface, comprising:
   a light source;
   a planar optical wedge ahead of the non-planar surface and disposed so that the large end of the wedge is adjacent the light source, with light from the source being transmitted through the wedge to the small end;
   an optical prism arranged between the wedge and the non-planar surface adjacent the small end of the wedge for directing the light at the small end toward the non-planar surface;
   the optical prism having a horizontally extending member and a vertically extending member;
   the end of the horizontally extending member adjacent the small end of the wedge; and
   the vertically extending member extending so that its outer edge makes a substantially acute angle with the horizontally extending member, and which outer edge faces the non-planar surface.

2. An arrangement for illuminating a non-planar surface used as an aircraft attitude indicator including an elongated casing having a viewing end, a bezel and a vertically disposed viewing window supported therein for closing the viewing end and the non-planar surface supported within the casing for displacement about an axis, the illuminating arrangement comprising:
   a light source supported at the top of the bezel;
   a vertically disposed light transmitting member supported by the bezel behind the viewing member and arranged with the light source for transmitting light from the top to the bottom of the bezel;
   a light directing member supported by the bezel and casing between the light transmitting member and the non-planar surface for directing the light at the bottom of the bezel toward the non-planar surface;
   the light transmitting member being an optical wedge having its large end at the top of the bezel for receiving light from the light source and its small end at the bottom of the bezel;
   the light directing member being an optical prism having a substantially J-shaped section with a horizontally extending member and a vertically extending member;
   the horizontally extending member being adjacent the small end of the wedge for receiving the light transmitted from the top to the bottom of the bezel; and
   the vertical member directing the transmitted light toward the non-planar surface.

3. An arrangement as described by claim 2, wherein:
   the non-planar surface is a sphere; and
   the light directing member directs light toward the bottom of the sphere.

* * * * *